United States Patent [19]

Woodhouse

[11] 4,058,010
[45] Nov. 15, 1977

[54] AIRPORT WIND SHEAR MONITORING METHOD AND APPARATUS

[75] Inventor: Charles F. Woodhouse, Glen Wilton, Va.

[73] Assignee: Approach Fish, Clifton Forge, Va.

[21] Appl. No.: 674,231

[22] Filed: Apr. 6, 1976

[51] Int. Cl.$^2$ ............................................. G01W 1/02
[52] U.S. Cl. ....................................................... 73/189
[58] Field of Search ...................... 73/189, 188, 178 T; 116/DIG. 9; 340/26, 27 NA; 244/114 R

[56] References Cited

U.S. PATENT DOCUMENTS

| | | | |
|---|---|---|---|
| 2,570,549 | 10/1951 | Hansell | 116/DIG. 9 |
| 2,805,572 | 9/1957 | Carruthers | 73/189 |
| 3,286,521 | 11/1966 | Stout | 73/189 |
| 3,340,732 | 9/1967 | Scoggins | 73/189 |
| 3,933,037 | 1/1976 | Alet | 73/170 R |

FOREIGN PATENT DOCUMENTS

| | | | |
|---|---|---|---|
| 971,300 | 1/1951 | France | 73/189 |
| 571,804 | 5/1924 | France | 73/188 |
| 35,879/70 | 5/1968 | Japan | 73/189 |
| 1,477/71 | 8/1967 | Japan | 73/189 |
| 474,821 | 1/1936 | United Kingdom | 244/114 R |

Primary Examiner—James J. Gill
Assistant Examiner—Anthony V. Ciarlante
Attorney, Agent, or Firm—Lowe, King, Price & Markva

[57] ABSTRACT

Wind conditions and anomalies in the proxmity of an airport runway approach and departure flight path may be monitored by the tethered deployment of a plurality of extremely light and expendable airborne vehicles such as kites or balloons in an array spaced from the projected runway ends and at graduated altitudes commensurate with the glide path altitude at a respective tether point. Vehicle flight conditions such as vertical and horizontal tether line repose angles and tether line strain are measured by ground level instrumentation and transmitted to appropriate receiver and display equipment. The measured data is compared to calibrated vehicle flight response to conclude wind direction and velocity at the vehicle flight position. Comparison of wind conditions at two or more flight path positions and altitudes will reveal the presence of operational conditions hazardous to aircraft. A remotely controlled, data measuring and telemetering vehicle tether is also disclosed which may be used in the aforedescribed combination or singularly for other aerological monitoring purposes.

42 Claims, 11 Drawing Figures

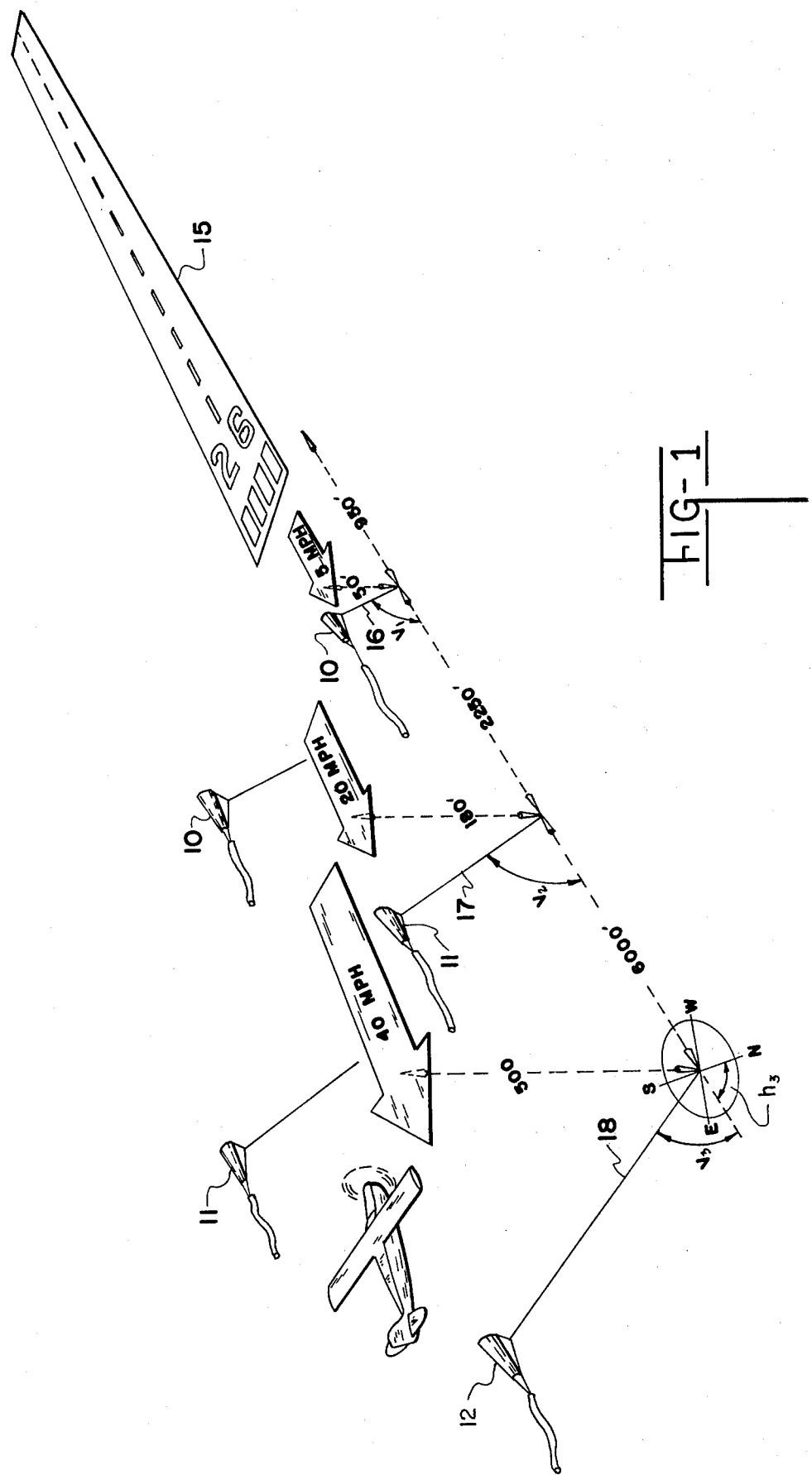

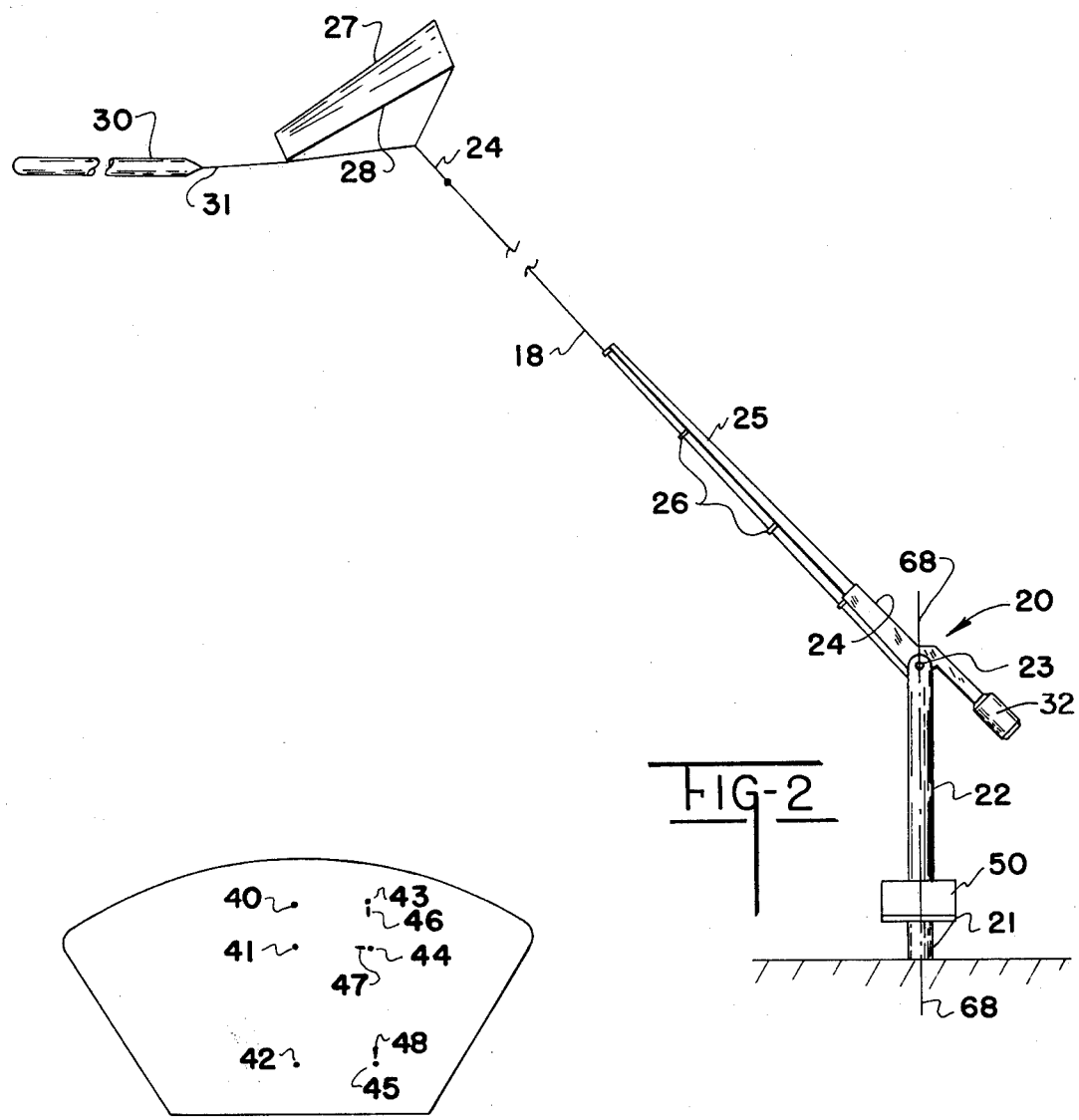

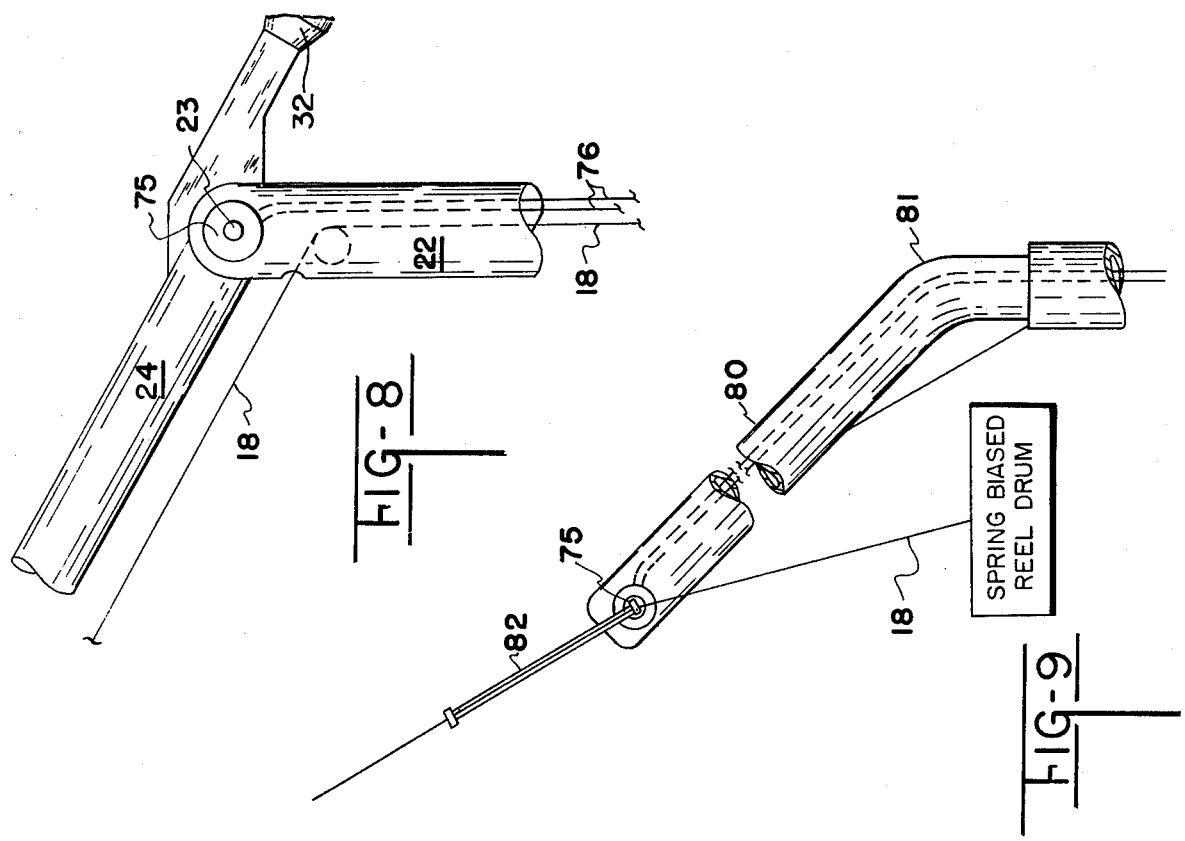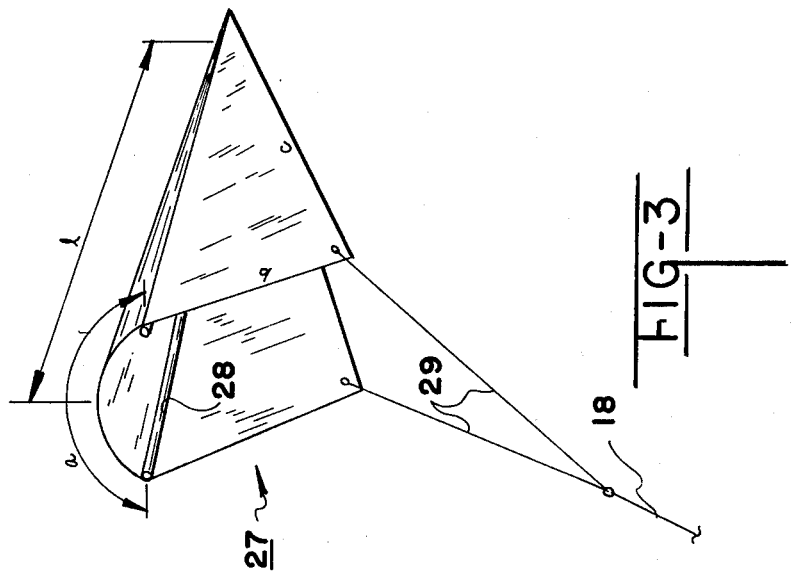

AIRPORT WIND SHEAR MONITORING METHOD AND APPARATUS

BACKGROUND OF THE INVENTION

1. Field of the Invention

The present invention relates to aerological condition measurement methods and apparatus. More particularly, the present invention relates to a method and apparatus for measuring wind conditions at two or more positions and altitudes within the approach and departure flight path of an airport runway.

2. Description of the Prior Art

Of the many meteorological and aerological factors affecting the operation of aircraft, one of the least recognized but frequently encountered circumstances is that of wind shear. This phenomenon is characterized by a gradient increase in wind velocity from ground level to approximately 2000 ft. elevation.

The most significant consequence of wind shear on aircraft is the effect on pilot judgment in the vulnerable takeoff and landing operational modes. When the condition is present, a descending aircraft must be strongly corrected as to either power application or glide slope to avoid stall as the craft enters increasingly lower velocity wind.

Another aerological circumstance affecting aircraft flight safety in the near proximity of the ground is that of small, slowly moving thermals. Thermals are vertical axis cylinders of rapidly rising air that may occur over any surface that is either reflective of sun rays or highly absorptive thereof. Many airport runways are such surfaces. As air is heated by ground radiation and convection, it rises to be replaced by cooler air. Consequently, a flow pattern develops whereby cool, surrounding air rushes radially inward to be heated at the ground base of the thermal. If the thermal is centered over the down wind end of an active runway, landing aircraft making a conventional final approach into the normally prevailing wind are suddenly caught in a strong tail wind very near the ground which drives the craft toward the ground.

Since wind shear and ground thermal phenomena are both low altitude conditions, a pilot must be particularly alert to unusual changes in his craft's airspeed and rate of descent in the last few seconds of his final approach to avoid premature and destructive contact with the ground when caught in one of the phenomena.

There are few visual or other objective indicators to reveal the presence of shear and thermal wind conditions. Even the existence of shear conditions has only recently been sufficiently recognized as to organize a definition thereof. The United States Federal Aviation Administration defines the phenomena as a change in wind speed and/or wind direction in a short distance resulting in a tearing or shearing effect. Efforts to monitor such conditions in the proximity of airports by mechanical means have been few, if any.

As previously understood, the monitoring of wind shear has been prohibited by the need to place heavy measuring equipment within the subject flow stream such as from towers as required by the disclosures of U.S. Pat. Nos. 3,616,692; 3,477,372; 3,246,514 and 2,619,527 or from airborne vehicles of sufficient carrying capacity to sustain an instrument package as taught by U.S. Pat. Nos. 3,229,517 and 1,913,512. The obvious consequence to such monitoring is that the measuring equipment would have to be placed in or near the zone of flight operations thereby creating an obstacle to navigation more hazardous than the aerological condition to be avoided.

Although ground based monitoring devices such as that disclosed by U.S. Pat. No. 3,182,499 are available for the stated purpose, the level of technological sophistication occasions a prohibitively high cost and are only applicable at locations physically remote from the actual aircraft glide path.

3. Purpose of the Invention

It is, therefore, an object of the present invention to teach a method and apparatus whereby wind velocity gradients and direction anomalies in the near proximity of airport runways may be safely and continously monitored.

Another object of the present invention is to provide airport controllers and pilots with a direct, telemetered instrument or radar indication of surface wind direction and intensity at glide slope altitudes along an airport runway approach and departure route.

Another object of the present invention is to provide a relatively inexpensive wind shear and direction anomaly indicating system whereby a pilot may be informed of relative gradients in wind conditions as he approaches a landing.

Another object of the present invention is to provide a wind condition measuring technique and apparatus that is safe for deployment in the near proximity of aircraft in flight.

SUMMARY OF THE INVENTION

These and other objects of the invention are accomplished by means of a system of small, airborne devices such as kites or balloons tethered at discrete locations along a runway approach route. Tether lengths are graduated so as to sustain a respective airborne device below and outside of the glide slope and localizer zone at a respective distance from the runway end.

Airborne device construction is relatively small, light and inexpensive. Expendability is of paramount importance. Flexible, plastic film and semi-rigid plastic foam kites are contemplated for airborne device construction. Similarly, helium or hydrogen inflated rubber or other balloons may be used.

Tethers are of low tensile strength cord so as to be easily broken in the event of collision by an aircraft.

Tether mooring at ground level, however, is at the end of an articulated wand which is rotatively free to assume any angle within a discrete spherical segment. Electrical devices are provided within the moor to continuously measure the kite or balloon angle of repose relative to the moor in the azimuth and vertical planes. Means are also provided to measure the tether line tension force and length.

In combination with an airborne device of known lift and drag coefficient, data may be generated and combined to derive the wind direction and velocity at the suspension altitude of the airborne device. Either the raw data or combined results therefrom may be transmitted by conventional means to the airport control tower or other suitable location such as an aircraft in flight for manual surveillance. When appropriate, pilots may be warned by air traffic control communication of the existence, location and intensity of hazardous, low altitude aerological conditions.

Moreover, by providing the airborne devices with high radar visibility, a pilot of a craft having such equipment may directly perceive an intuitive understanding of such wind conditions by visually evaluating the collective array of such relative repose angles as presented on his airborne radar scope.

BRIEF DESCRIPTION OF THE DRAWING

Relative to the drawing wherein like reference characters are used throughout the several figures of the drawing to designate like or similar elements:

FIG. 1 is a perspective illustration of an airport runway provided at one end thereof with several tethered, airborne devices pursuant to the systematic operation of the present invention.

FIG. 2 is a presently preferred embodiment of a tether mast and airborne device flight system pursuant to the present invention.

FIG. 3 is a perspective illustration of a particular kite design that has been found useful in carrying out the invention objectives.

FIG. 5 is a radar scope pattern whereupon signals from one embodiment of the present invention are displayed.

FIG. 8 is an elevational detail of the horizontal journal end of the rotating mast standard.

FIG. 9 is an elevational detail of an alternative embodiment for measuring the vertical angle of the tether line.

DESCRIPTION OF THE PREFERRED EMBODIMENTS

Figure 4:
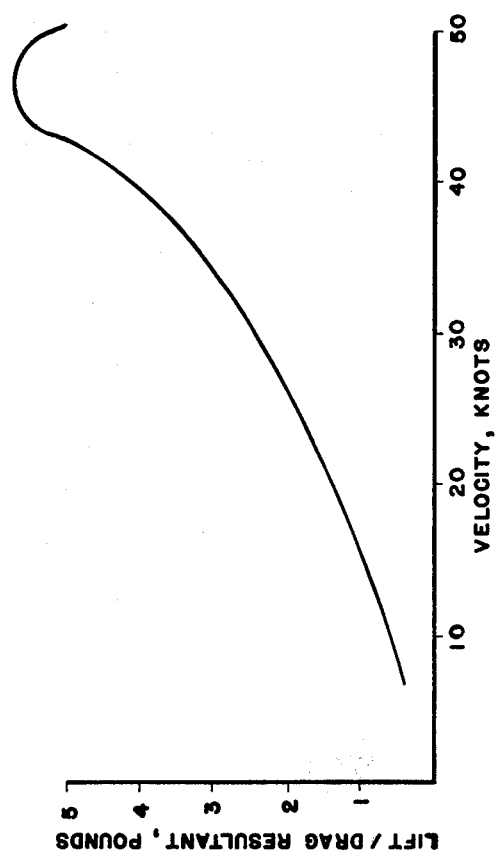
FIG. 4 is a calibration curve relevant to the kite design of FIG. 3.

The overall principle of the present invention is represented by FIG. 1 wherein a series of airborne vehicles 10, 11, 12, etc. are positioned along the approach route to an aircraft runway 15. Such positionment may conveniently coincide with the standard, ILS 3° glide slope angle. This arrangement would place an inner or threshold vehicle 10 at the 50 foot altitude above a fixed tether point that is 950 feet from the runway end. A second vehicle 11 may be aligned with the ILS Middle Marker at 3500 feet from the runway end and tethered to fly at approximately 180 feet altitude. A third vehicle 12 is shown as positioned at 9500 feet from the runway end and tethered to fly at approximately 500 feet altitude.

One or more additional vehicles not shown may be placed further from the runway at greater altitudes and/or at the end boundary of the runway at 20 feet altitude, for example, to provide surface wind data for the critical touchdown zone.

For obvious safety reasons, these airborne vehicles 10, 11 and 12 should be displaced laterally from the runway centerline by an appropriate safety margin of at least beyond the localizer limits; the lateral spacing increasing fan-like at the more remote positions.

While the illustrated example shows five (5) vehicles per runway end, three (3) on one extended side of the runway and two on the other, it should be understood that only two (2) vehicles, spaced longitudinally out from the runway end represent a minimum number to practice one aspect of the invention. There is no maximum number limit.

Also for safety reasons, these vehicles 10, 11 and 12 are constructed of the lightest and most frangible material suitable for performing the vehicle objectives. For example, a 15 foot long balloon constructed from a 6-inch diameter tube of 0.5 mil (0.0005 in.) polymer film such as polyethylene, polyvinylchloride or mylar and filled with helium serves the invention objectives well and presents no significant safety hazard for even the lightest of aircraft. Present experience with the invention, however, biases a preference for kites as the airborne vehicle. This preference will be further developed and further reference to the airborne vehicle, as such, will be as a kite although it should be understood that either a kite or balloon or combination of the two may be used for the purpose.

Referring again to FIG. 1, it is seen that certain angular measurements are taken relative to the respective tethers. Considering kite 12 and the respective tether 18, in particular, these measurements are of the vertical angle $V_3$ and of the horizontal azimuth angle $h_3$. Also measured from the tether is the tensile force held by the tether.

When coupled with known and calibrated flight characteristics of a chosen kite design, it will be understood to those knowledgeable of aerodynamics that a reasonably accurate measurement of both wind velocity and direction may be derived from these three measured parameters. Of course, the wind characteristics concluded from each kite are relevant only to the position and altitude at which that kite is deployed. However, when two or more such wind monitors are positioned at different altitudes within the runway glide slope, the measured data combustion acquires a greatly expanded significance. For a complete informational array, such wind monitors may be positioned in a matrix extending from both ends at graduated, glide slope altitudes up to approximately 1500 feet.

Although such complete monitoring of a runway glide slope may require as many as 24 such tethered kites, six on each side of the runway respective to each end thereof, it will be appreciated that the ground secured instrumentation required for each kite is simple, reliable and inexpensive. The kites, per se, have a value of only a few cents each and may be considered expendable components of the system, it being expected that such will be frequently lost due to harmless aircraft collision or unusually high wind velocities. Furthermore, kites have calibrated aerodynamic lift/drag flying characteristics that are substantially unaffected by temperature and pressure changes.

In operation, the information acquired from the several kites may be telemetered to either the airport control tower or an appropriately instrumented aircraft or both. Obviously, therefore, when a pilot knows he will encounter a drastic differential in wind velocity and direction at respective altitudes along his runway approach path, he may prepare himself and his craft accordingly. Moreover, objective information of the quality provided by the present invention will permit the pilot to immediately determine whether the approach wind conditions exceed the limits of safety. Since dangerous levels of shear, crosswind and thermal conditions are known to be sporadic, landings may be attempted and aborted repeatedly in complete safety thereby avoiding a complete and indefinite closure of the affected runway to continued operations.

Another unobvious benefit of the present invention arises from the ability to detect vortex turbulence. This aerodynamic phenomena is a form of localized wake turbulence left behind an aircraft similar to a tornado. The wake vortices left by extremely large aircraft may be of sufficient size and intensity to be destructively dangerous to small aircraft. Since these vortices cannot be seen, the possibililty of presence at the end of a runway requires the airport controller to delay, for an interim of three to four minutes, a subsequent operation following the landing or takeoff of such large aircraft. Such delays are expensive interims in the operation of a large traffic volume commercial airport. The expense of such delays is particularly perplexing when it is known that dangerous levels of such wake turbulence remain in the runway approach path only occasionally. It is on this point that use of the present invention expands the value thereof. In this regard, an airport controller may monitor the informational array provided by the several kites following an aircraft landing or take-off operation. Since the generation of two vortices, one from each wingtip, is known to result from each such aircraft operation, the passage of both vortices outside the glide path boundary defined by the kite matrix will be detected and transmitted by a momentary instability of one or more kites. The vortices may drift laterally in opposite directions from the flight path in which case kites on opposite sides thereof may be disturbed simultaneously. Conversely, the vortices may drift in the same direction whereupon the same kite will be disturbed twice in rapid sequence. In either case, the controller is informed that both vortices have passed from the flight path and approval for a subsequent operation may be granted immediately. On the other hand, if only one or no vortex disturbance is signified by the kite matrix, it may be concluded that a vortex remains in the flight path and a safe operational delay is justified.

FIG. 2 illustrates a presently preferred mast and tethered kite embodiment for implementing the invention objectives. As shown, the mast 20 comprises a ground anchor portion 21 and a rotating standard portion 22. At the upper end of the rotating standard is provided a horizontal axis journal 23 which positions a pole socket 24 with counterweight 32 for rotation in a vertical plane.

Secured to pole socket 24 is a pole 25 having line guides 26 through which tether line 18 is threaded.

At the distal end of tether line 18 is secured a kite 27. The kite design illustrated by FIGS. 2 and 3 is, by no means, exclusive or of unique value to the present system except that it is extremely simple and has stable flight characteristics beyond a 40 mph wind velocity as represented graphically by the velocity – lift resultant calibration curve of FIG. 4. This curve represents the performance of a FIG. 3 type kite of 4 mil polyethylene having a channel length of 1 of 18 inches, a channel arc $a$ of 13 inches, a leading panel edge $b$ of 9 inches and a trailing panel edge $c$ of 15 inches. The channel chines 28 are rigid dowel members secured to the polyethylene skin of the kite. The tether bridle 29 is attached to the tether line 18 and to the respective kite side panels. Kites of the aforedescribed configuration are more particularly described by U.S. Pat. No. 3,767,145.

From the tail portion of kite 27, a drogue or stabilizing tail 30 may be secured by means of a calibrated tension line 31. Since the flight characteristics and stability of kites vary widely between respective designs, some may have no need of a stabilizing tail. On the other hand, a long, narrow tube or tail 30 inflated with a lighter-than-air gas such as helium may serve several other functions in addition to that of kite stabilization. For example, the tube 30 may be provided with enough bouyancy to support all of the airborne components of the system at a specified altitude in dead calm wind conditions. In this manner, the kite is maintained in readiness for flight when sufficient wind conditions resume.

As another exemplary utility for a long, stabilizing streamer 30, such may be aluminized for high radar visibility.

When combined with provision for radar signal generation at the mast 20 anchor site, a scope picture such as that illustrated by FIG. 5 may be presented. Radar blips 40, 41 and 42 represent the inner, middle and outer marker ILS navigation points, respectively. Radar blips 43, 44 and 45 are generated from respective mast anchor positions. Blips 46, 47 and 48 are signal reflections from an aluminized streamer such as that described above. By studying the blip pattern of FIG. 5, it will be noted that the wind direction at the inner and outer marker positions 40 and 42, respectively, is reversed. The middle marker 41 position has a wind direction 90° of the flight path approaching from the starboard side of the craft.

The purpose in securing such a streamer 30 with a calibrated tension line 31 is to provide a release of the streamer at high wind velocities. Otherwise, the streamer drag may upset the presumed lift/drag correlation of the kite.

Figure 6:
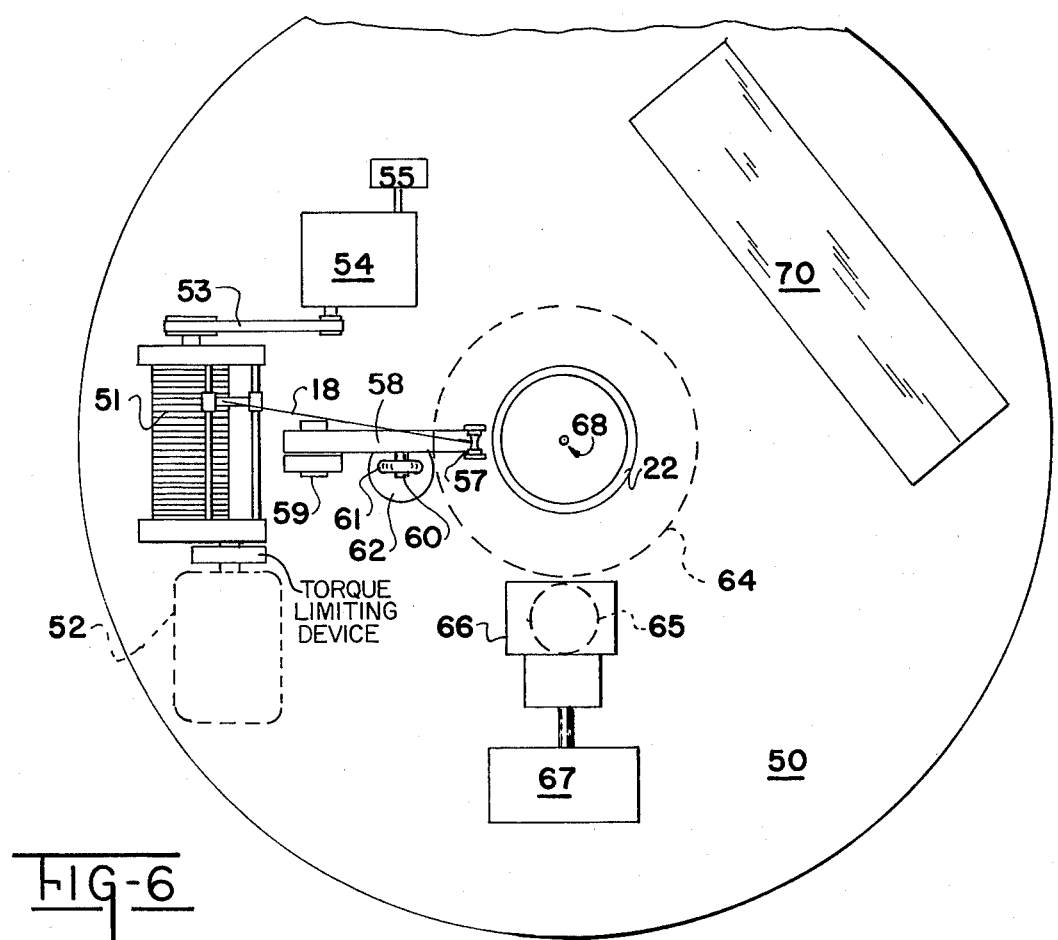
FIG. 6 is a plan of the tether instrumentation table.
Figure 7:
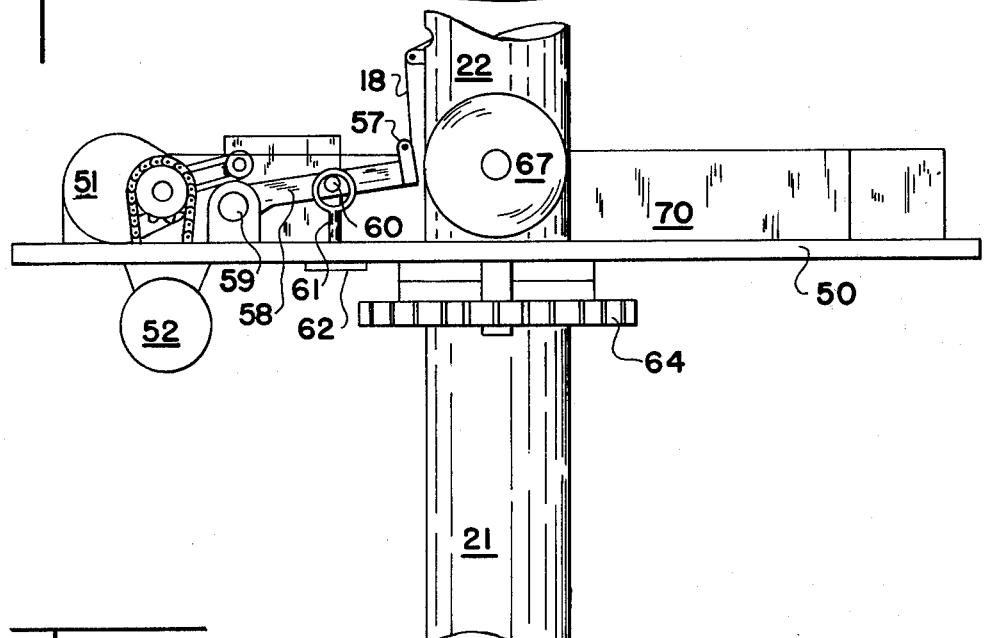
FIG. 7 is an elevation of the tether instrumentation table.

FIGS. 6 and 7 illustrate the instrumentation details of the mast 20 and are physically located on a rotary table 50 at the interface between the mast ground anchor 21 and the rotating standard 22.

The several components employed for the purpose of controlling the kite flight and measuring the kite response to wind conditions comprise a level-wind line reel 51 driven by a reversible motor 52. From the line reel is driven, by means of transmission belting 53, a line deployment counter 54. A signal generator 55 provides instrument signals indicative of the line quantity deployed by the reel 51 to a transmit/receive control console 70.

From the reel 51, the tether line 18 is threaded under a sheave 57 that is secured to the end of a lever 58 journaled at an anchored pivot 59. Intermediate of the journal and sheave ends of the lever 58 is a pin 60 which projects through an eye bolt strain sensor actuator 61. The actuator 61 cooperates with a strain sensor 62 which is secured to the table 50 platform.

Similar to the signal generator 55, strain sensor 62 transmits instrument signals indicative of the load impressed thereon to the transmit/receive control console 70. It will be appreciated by the mechanical arrangement of the tether line 18 relative to the lever 58 and strain sensor 62 that such load signals may be calibrated directly to the kite holding tensile force carried by the tether line 18.

Beneath the rotary platform 50 are provided two meshed spur gears 64 and 65. Gear 64 is rigidly secured to anchor 21 and does not rotate. Gear 65 is rotatively mounted on the input drive shaft of a speed reducer 66. Since the speed reducer 66 is secured to the platform 50, rotation of same about the vertical axis 68 through the standard 22 causes the gear 65 to rotate in orbit about the fixed gear 64. The output drive of speed reducer 66 is coupled with an electrical signal generating device such as a rotary potentiometer 67 which will provide the transmit/receive console 70 with a signal indicative of whatever angular position the platform 50 may take about the mast axis 68.

When oriented relative to a compass heading, the moment forces applied by the tether line 18 to the mast pole 25 about the mast rotational axis 68 will turn the mast into downwind alignment with the direction of wind sustaining the kite 27. Accordingly, console 70 may transmit the corresponding azimuth angle $h_3$.

The vertical angle $V_3$ of the tether line 18 is measured for the purpose of coordination with the tether line length as measured by the counter 54. A simple trigonometric calculation from the two measured parameters will yield the vertical elevation of the kite.

To measure the vertical angle $V_3$, a rotary potentiometer 75 or similar device for signaling an angular displacement is mounted on the rotating standard 22 about the journal 23 as illustrated by FIG. 8. As the pole socket 24 is rotated from the upright, no-wind position, the vertically displaced angle is sensed by the potentiometer 75 and an appropriate signal is conducted via electrical leads 76 to the transmit/receive console 70.

An alternative embodiment for vertical angle measurement is illustrated by FIG. 9 wherein the vertically pivoting mast socket 24 is replaced by a rigid pole 80 having a fixed angle joint 81. The vertical angle sensing potentiometer 75 is secured to the pole 80 at the upper, distal end of the joint 81 and a line alignment guide 82 is secured to the rotative element of the potentiometer 75. In this case, the tether line 18 may be routed directly from the strain measuring sheave 57 to the guide 82 to avoid contact with additional mast elements in freezing weather.

The transmit/receive console 70 may be constructed to telemeter data and operator commands by either hardwire transmission or wireless. In either case, the result of operational control and measured data transmission is the same.

Exactly what data is transmitted is a matter of designer choice. If it is desired to transmit wind velocity directly from the tether dedicated console 70, a mechanical cam or electronic computer will have to be provided in each console 70 to coordinate the measured tether line tension with the calibrated lift/drag characteristic of the kite. Obviously, this coordination function may be unitized for all tether units by simply transmitting the raw data of each unit to a single computational unit that is programmed with the necessary correlation functions. In this way, equipment for standardized wireless transmission of meaningful intelligence to aircraft in-flight may be centralized for maintenance convenience.

Similarly, the vertical kite altitude data may be processed within the console 70 for direct, wireless transmission of altitude conclusions to aircraft or, alternatively, processed by a central computer.

Within this scope of design choice, the several command and response functions of the console 70 will be illustrated by a representative operational series. From this illustration, practioners of the remote mechanical controlling arts will understand exactly what control components are necessary and the scope of alternatives available.

Consider first, the flying control system for kites 11 and 12 located laterally of the middle and outer ILS marker beacons.

When erected, the respective kites, 18 in particular, will hang limp from the vertically erect mast poles 25 in dead calm air unless they are provided with bouyant stabilizers 30 in which case, the kites will hang inactively from the vertically tethered balloon which is held at a low retracted tether altitude.

When sufficient wind arises at the static maintenance elevation of the kite to activate it aerodynamically, a restraining tension will be exerted in tether line 18. The corresponding strain signal will be transmitted to the console 70 from sensor 62. This strain signal will be compared to a predetermined set-point, 0.5 pounds for example. The actual tension selected will be dictated by the kite flight characteristic curve to correspond with the minimum flight velocity of the kite.

Should the strain on tether line 18 exceed the 0.5 pound set-point, a command signal will issue to reel motor 52 to deploy line. In addition, the reel motor speed is regulated to maintain a 0.5 pound line tension during deployment to assure continuous, stable flight.

Should the kite reach an intermediate altitude whereat the wind velocity is insufficient to maintain the line tension at 0.5 pounds, the motor 52 will reverse to retract the line at a rate commensurate with the set-point tension.

Such motor direction control is managed by coordination with the line counter 54 and vertical angle $V_3$ measuring potentiometer 75. For each tether unit 20, the vertical altitude conclusion derived from the counter 54 and the potentiometer 75 is provided with respective, fully retracted and fully deployed set-points. The fully deployed set-point for a particular tether corresponds to the desired operating altitude near or within the glide slope for that monitoring unit. If the line counter 54 and vertical angle $V_3$ measuring potentiometer 75 indicate that the kite is between the altitude set-point extremes, a line tension of less than 0.5 pounds will issue a line recovery command to the motor 52 whereas a tension of greater than 0.5 pounds will cause a deployment of line.

In this regard, it is extremely useful to the airport controller to have the capability to selectively command a change in the high or fully-deployed set-point.

When signals from line counter 54 and vertical angle potentiometer 75 indicate that the predetermined operational altitude has been reached, reel motor 52 will no longer respond to line tension signals in excess of the set point. Under this condition, the line tension will increase as will the vertical mast angle $V_3$. If the four parameters of deployed line length, line tension, vertical angle and azimuth angle for each tether unit are all transmitted back to the airport control center, it may be observed by an airport controller that the line length and vertical angle are stable at the high set-point altitude. Consequently, the line tension data may be coordinated with the kite calibration curve to conclude the magnitude of wind velocity at the set-point altitude.

It has been previously mentioned that the tether line material must, for safety reasons, have a relatively low maximum strength. Those of ordinary skill will verify that turbulent winds do not maintain a steady velocity but come in gusts. Such gusts often are of such momentary velocity as to cause the failure of an otherwise safe maximum tensile strength of the tether line. Accordingly, reel 51 is provided with a slip clutch (not shown) or other torque limiting device in the power transmission link between the reel 51 and motor 52. This slip clutch may be adjusted to allow further line deployment from the reel 51 when the line tension reaches a magnitude of some percentage less than the ultimate line strength, 4.5 pounds for this example.

Therefore, when turbulent gusts or vortices act on the kite with such force as to exceed the clutch slip limit, line is deployed to attenuate the shock thereby preventing unnecessary line breakage.

However, such additional gust deployment of tether line 18 will be registered by the line counter 54 and associative control elements as exceeding the high set-point altitude. This circumstance will immediately initiate a command to motor 52 to start line recovery. Consequently, when the line tension falls below the slip clutch limit, the motor 52 will regain directional and power control over the reel 51 to start line recovery. Such recovery will continue until the high set-point altitude of deployed line is regained.

Eventually, winds at the desired flight altitude will diminish to the point whereat the kite and respective tether line burden can no longer be sustained. Under this condition, an electrical signal comparison to the 0.5 pound set-point will cause the issuance of a command to the reel motor 52 to recover line at a rate sufficient to maintain stable flight. Such line recovery will continue until an altitude is found whereat the wind will sustain kite flight or until the lower set-point value of line length is reached.

Since the wind monitoring unit most proximate of a runway end will have the kite thereof deployed at only 20 to 50 feet of altitude, it will often be sufficient for this unit to provide only a fixed length tether line; no altitude computation being necessary. Accordingly, the vertical angle measurement capacity may be deleted. For gust accommodation with such low altitude units, the tether line may be anchored to a mechanical spring wound reel. Only line tension and azimuth direction need be measured for data transmission. Accordingly, only two data transmission channels are necessary for each such unit.

By standardization of wireless channels guarded for the purpose, the data acquired by the present invention may be integrated with ILS transmissions for airborne receipt by appropriately equipped aircraft. In this regard, the information may be displayed in the manner illustrated by FIG. 10 wherein a dial type indicator is used to display the relative wind direction as measured by monitoring unit 20 located at range positions coinciding with the ILS marker beacons.

As shown, the dial indicator comprises an outer azimuth ring 91 divided in compass degrees. The ring is manually rotatable so that the bearing of the objective runway may be positioned under the reference mark 92: in this case 260°.

Figure 10:
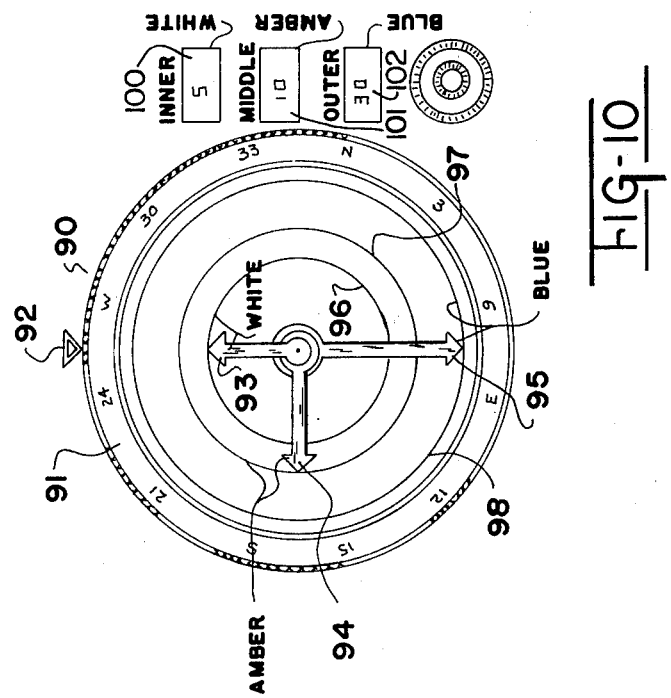
FIG. 10 is an airborne receiver instrument display particularly well adapted for the purposes of the present invention.

The wind direction indicating needles 93, 94 and 95 are of different length to be easily discernible, each from the other. Moreover, each needle is color-coded to correspond with existing marker beacon color-codes and terminates on the periphery or a correspondingly color-coded band 96, 97 and 98. Each needle 93, 94 and 95 is actuated by a respective servo that is responsive to wind direction transmission signals from a respective monitoring unit 20. Accordingly, in the FIG. 10 illustration, the inner marker unit has measured the wind as blowing from the 80° azimuth direction, which is downwind of the intended flight path, and has transmitted this fact to a radio receiver in the aircraft with consequently actuates the appropriate servo to drive the short, white needle 93 to the position illustrated that is in axial alignment with the aircraft final approach heading.

Similarly, the middle marker monitoring or mast unit 20 has actuated the servo drive of amber needle 94 to drive it to a position which indicates a 350° wind.

Blue needle 95 shows the head wind at the outer marker altitude to have a bearing of 260°.

Simultaneous with the directional display of dial 90, a digital indication of the wind velocity is superimposed on the respective marker beacon lights 100, 101 and 102. Such presentation need not interfere with existing marker beacon display systems with initiate the illumination of an indicating light and corresponding audio signal when the craft passes over the respective beacon position.

It is not necessary to transmit to an aircraft the altitude of the measured winds since this parameter is presumed by the pilot to be at glide slope altitude for the respective ILS marker beacon.

Since the wind directional dial indication is actuated by receiver/servo units that are independent of the wind velocity and marker beacon receiver, each may be modularized for different panel combinations. In this regard, a wind velocity and marker beacon receiver module may be combined with the radar display of FIG. 5.

Figure 11:
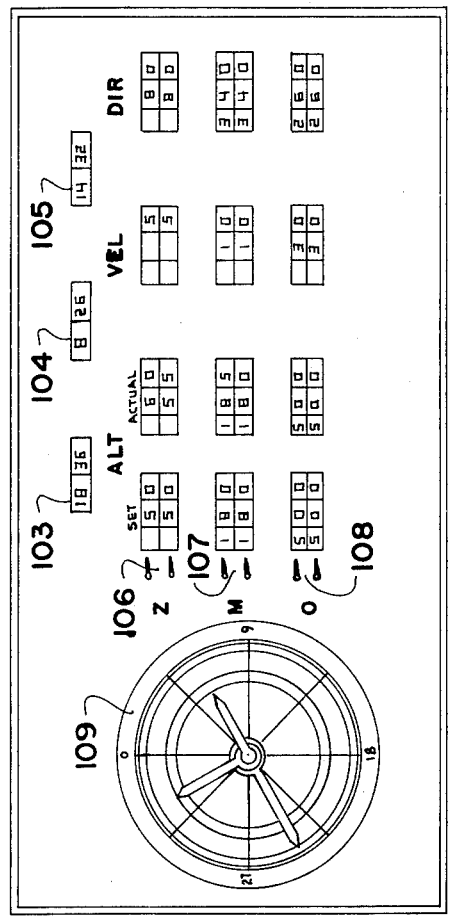
FIG. 11 is a control tower located instrument display particularly well adapted for the present invention.

A control tower located display panel corresponding to the present invention may take the form of that illustrated by FIG. 11. Across the top, arranged in pairs are switch sets 103, 104 and 105 for the deployment of a runway monitoring matrix. Actuation of the switch labeled 8/26 of the 104 set will direct all tether mast units 20 positioned out from the approach end of the 260° runway to set-point altitude. Deactivation of this switch will direct a full retraction of the same tether units. The same principle applies for switch 103 relative to the 180°/360° runways and switch 105 relative to the 140°/320° runways.

Simultaneous with actuation of the 260° runway tether matrix by switch 104 labeled 8/26, the panel digital display modules are activated as responsive to the data transmissions emitted by the selected tether units. Thus, the horizontal line of display units labeled Z relate to the inner marker tether units 20 for kites 10 (FIG. 1), the display line M corresponds to the tether units respective to kites 11 and the display line O corresponds to the tether units respective to kites 12.

Respective to each horizontal line A, M and O, there are upper and lower display units. These displays correspond to tether units on opposite sides of the runway centerline.

In the altitude or ALT column group there is a set-point (SET) column and ACTUAL altitude column. To the left of the set-point column is a column of toggle switches 106, 107 and 108. Each switch controls the altitude set-point of a respective tether unit 20, the set-point setting being displayed in the SET column.

The ACTUAL altitude displays are self-explanatory and are the conclusive result of a calculated combination of the counter 54 and vertical angle potentiometer 75 measurements.

The wind velocity acting on the respective kites, as calculated from the line tension and the lift/drag calibration function, is displayed in the VEL column.

Wind direction is displayed digitally from the azimuth potentiometer 67 signals in the DIR column and in analog by the three needle compass dial 109.

From study of the FIG. 11 panel arrangement, it will be appreciated that an air traffic controller may determine at a glance whether the wind respective to a given runway is safe for aircraft penetration and, if difficult conditions are present, exactly where, at what altitude and how much of a difficulty may be expected.

The foregoing specification has described a practical and relatively inexpensive method of monitoring hazardous wind conditions in the low altitude proximity of an aircraft runway. Also disclosed are specific design configurations of equipment suitable for exploiting this novel method. It should be appreciated however, that many alternatives are available to those of ordinary skill in the art in the number of tether units deployed, the pattern of dispersion and the particular, automatic kite flying equipment used. For example, a quantity of 12 tether units per runway end has been given for maximum coverage. However, those of ordinary skill in the art recognize that only 2 such tether units are necessary for minimum functional coverage for shear conditions. Moreover, even one such tether unit per runway end has greater informational value than the conventional aircraft windsock. While the windsock visually demonstrates wind direction, so too does the present invention in addition to a velocity communication. Furthermore, it is evident that a reel drum spring biased to a retracted position could be used in some situations in place of a motor-driven drum as depicted in FIG. 9.

The value of only one tether unit is further appreciated when some of the other aerologic data acquisition uses are realized. For example, one or more such units may be conveniently employed to examine wind flow currents around buildings and other architectural structures. Aircraft portable units may be dropped in remote locations to determine low altitude wind conditions of emergency heliports and military artillery assault regions. Similarly, only one tether unit may be used to determine wind shear and turbulence along the initial launch trajectory of heavy rockets and for field wind flow studies in micrometeorology.

Accordingly, as my invention,
I claim:

1. A method of detecting hazardous wind conditions in the low altitude flight path of an aircraft, said method comprising the steps of:
   a. calibrating the lift/drag flying characteristics of a tethered flight vehicle,
   b. positioning a plurality of tether anchors to the ground at spaced positions along an approximate extension line from an aircraft runway end,
   c. securing a tether mast to each anchor with a spherical segment of articulation freedom,
   d. flexibly tethering a said calibrated flight vehicle to each of said masts for flight at a respective altitude near an aircraft approach path to said runway,
   e. measuring the resultant tether restraint force exerted by the flight of a vehicle on a respective mast,
   f. measuring the resultant azimuth angle to which a tether restraint force aligns a respective mast to determine the direction of wind acting upon the respective vehicle,
   g. coordinating the resultant tether restraint force of a respective vehicle to the calibrated flying characteristics of said vehicle to determine the velocity of wind acting thereon, and
   h. coordinating the wind and velocity determinations from said plurality of vehicles to determine the safety of wind conditions within said approach path for aircraft operation.

2. A method as described by claim 1 wherein a vertical repose angle to which a tether restraint force aligns a respective mast is measured for determination of the vertical altitude at which a respective flight vehicle is sustained.

3. A method as described by claim 1 wherein said vehicle and flexible tether means are of selected mass and strength as to be incapable of physical damage to an aircraft colliding therewith.

4. A method as described by claim 1 wherein wireless signals proportionate to the determined wind velocity and direction are transmitted from at least two such vehicle tether units for receipt by aircraft in flight.

5. A method as described by claim 4 wherein said transmitted wind and velocity signals are received and displayed within an in-flight aircraft as comprehensible information.

6. A method as described by claim 5 wherein said comprehensible information is displayed in such a manner that the altitude and coordinate position of the wind to which the information relates may be concluded.

7. A method as described by claim 1 further comprising the steps of emitting radar responsive signals from the near proximity of said tether anchors and providing said vehicles with radar signal reflecting means.

8. An apparatus for detecting hazardous wind conditions in the low altitude flight path of an aircraft, said apparatus comprising:
   a. a plurality of tether anchor means secured to the ground at spaced locations along an approximate extension line from an aircraft runway end,
   b. a tether mast secured to each tether anchor, each combination of mast and anchor means constituting a tether fixture,
   c. a flexible tether line having one end thereof secured to each said tether fixture and the other end thereof secured to a windborne vehicle having known lift/drag flying characteristics,
   d. means to measure a resultant tether restraint force exerted on said respective fixture by each respective vehicle in tethered, windborne flight,
   e. means to measure the azimuth angle vehicle flight in a wind,
   f. means to coordinate the tether restraint force of each vehicle with respective flight characteristics to determine the velocity of wind acting on said vehicle, and
   g. means to coordinate the wind azimuth angle and velocity acting on one of said vehicles with azimuth angle and velocity of at least one other said vehicle to determine the safety of wind condition for aircraft operation.

9. Apparatus as described by claim 8 wherein means are provided to measure the vertical repose angle of a respective tether line to determine the vertical flight altitude of the respective vehicle.

10. Apparatus as described by claim 8 wherein said one end of at least a portion of said tether lines is secured to a reel drum.

11. Apparatus as described by claim 10 wherein said reel drum is spring biased to a retracted position.

12. Apparatus as described by claim 10 wherein means are provided to measure the length of tether line deployed from said reel drum relative to a low set-point position 13. Apparatus as described by claim 12 wherein means are provided to measure the vertical repose angle of a respective tether line, said vertical angle measurement means and said tether line length measurement means being coordinated by means to determine the flight elevation of a respective vehicle.

14. Apparatus as described by claim 13 comprising means to transmit signals proportional to said flight elevation, said azimuth angle and said wind velocity to a remote receiving station.

15. Apparatus as described by claim 8 wherein said respective vehicles are flown with a tether line length sufficient to maintain said vehicles at respective altitudes within an aircraft glide slope path to said runway end.

16. Apparatus as described by claim 15 wherein said vehicles are provided with radar reflective means.

17. Apparatus as described by claim 8 wherein said vehicles are of the lighter-than-air type.

18. Apparatus as described by claim 8 wherein said vehicles are of the heavier-than-air type.

19. Apparatus as described by claim 18 wherein a lighter-than-air stabilizer is tethered to said vehicles.

20. A method of detecting hazardous wind conditions in the low altitude flight path of an aircraft, said method comprising the steps of:
   a. positioning a plurality of anchor means on the ground at spaced positions along an approximate extension from an aircraft runway end,
   b. securing a flight vehicle having known lift/drag flying characteristics to each of the anchor means with a tether line,
   c. maintaining the tether lines at different lengths for effecting flight of the vehicles at different altitudes near an aircraft approach path to said runway,
   d. measuring restraint force exerted by the flight of the tethered flight vehicle on each tether line,
   e. measuring the resultant azimuth angle of each tether line,
   f. coordinating the restraint force of each vehicle to its known lift/drag characteristics to determine the velocity of the wind acting thereon, and
   g. monitoring the wind velocity and direction of all the tethered flight vehicles to determine the safety of wind conditions within the approach path for aircraft operation.

21. A method as defined in claim 20 wherein a tether mast is pivotally mounted about a vertical axis at each anchor means.

22. A method as defined in claim 20 wherein said vehicle and tether line are of selected mass and strength as to be incapable of physical damage to an aircraft colliding therewith.

23. A method as defined in claim 20 wherein wireless signals proportionate to the determined wind velocity and direction are transmitted from at least two such vehicle tether units for receipt by aircraft in flight.

24. A method as defined in claim 20 wherein said transmitted wind and velocity signals are received and displayed within an in-flight aircraft as comprehensible information.

25. A method as defined in claim 24 wherein said comprehensible information is displayed in such a manner that the altitude and coordinate position of the wind to which the information relates may be concluded.

26. A method as defined in claim 20 wherein radar responsive signals are emitted from the near proximity of said tether anchors and said vehicles are provided with radar signal reflecting means.

27. An apparatus for detecting hazardous wind conditions in the low altitude flight path of an aircraft, said apparatus comprising:
   a. a plurality of flight vehicles having known lift/drag flying characteristics secured to respective tether lines at spaced locations along an approximate extension line from an aircraft runway end,
   b. the tether lines at at least two of the spaced locations having different lengths to effect flight of the vehicles at different altitudes near an aircraft approach path to said runway,
   c. means for measuring restraint force exerted by the flight of the tethered flight vehicle on each tether line,
   d. means for measuring the resultant azimuth angle of each tether line,
   e. means for coordinating the restraint force of each vehicle to its known lift/drag characteristics to determine the velocity of the wind acting thereon, and
   f. means for monitoring the wind velocity and direction of all the tethered flight vehicles to determine the safety of wind conditions within the approach path for aircraft operation.

28. Apparatus as defined in claim 27 wherein means are provided to measure the vertical repose angle of each tether line to determine the vertical flight altitude of the flight vehicle secured thereto.

29. Apparatus as defined in claim 28 wherein said one end of at least a portion of said tether lines is secured to a reel drum.

30. Apparatus as defined in claim 29 wherein said reel drum is spring-biased to a retracted position.

31. Apparatus as defined in claim 29 wherein means are provided to measure the length of tether line deployed from said reel drum relative to a low set point position.

32. Apparatus as defined in claim 31 wherein means are provided to measure the vertical respose angle of a respective tether line, said vertical angle measurement means and said tether line length measurement means being coordinated by means to determine the flight elevation of a respective vehicle.

33. Apparatus as defined in claim 32 comprising means to transmit signals proportional to said flight elevation, said azimuth and said wind velocity to a remote receiving station.

34. Apparatus as defined in claim 27 wherein said vehicles are of the lighter-than-air type.

35. Apparatus as defined in claim 27 wherein said vehicles are of the heavier-than-air type.

36. Apparatus as defined in claim 35 wherein a lighter-than-air stabilizer is tethered to said vehicles.

37. Apparatus as defined in claim 27 wherein said respective vehicles are flown with a tether line length sufficient to maintain said vehicles at respective altitudes within an aircraft glide slope path to said runway end.

38. Apparatus as defined in claim 37 wherein said vehicles are provided with radar reflective means.

39. A method of detecting hazardous wind conditions in the low altitude flight path of an aircraft, said method comprising the steps of:
 a. positioning a plurality of anchor means on the ground at spaced positions along an approximate extension from an aircraft runway end,
 b. securing a flight vehicle to each of the anchor means with a tether line,
 c. maintaining the tether lines at different lengths for effecting flight of the vehicles at different altitudes near an aircraft approach path to said runway,
 d. measuring the resultant azimuth angle of each tether line to determine the wind direction at the vehicles,
 e. determining the velocity of the wind acting on each of the flight vehicles, and
 f. monitoring the wind velocity and the wind direction for all the tethered flight vehicles to determine the safety of wind conditions within the approach path for aircraft operation.

40. An apparatus for detecting hazardous wind conditions in the low altitude flight path of an aircraft, said apparatus comprising:
 a. a plurality of flight vehicles secured to respective tether lines at spaced locations along an approximate extension line from an aircraft runway end,
 b. the tether lines at at least two of the spaced locations having different lengths to effect flight of the vehicles at different altitudes near an aircraft approach path to said runway,
 c. means for measuring the resultant azimuth angle of each tether line to determine the wind direction at the vehicles,
 d. means for determining the velocity of the wind acting on each of the flight vehicles, and
 e. means for monitoring the wind velocity and the wind direction for all the tethered flight vehicles to determine the safety of wind conditions within the approach path for aircraft operation.

41. An apparatus for detecting hazardous wind conditions in the low altitude flight path of an aircraft, said apparatus comprising:
 a. a plurality of tether anchor means secured to the ground at spaced locations along an approximate extension line from an aircraft runway end,
 b. a tether mast secured to each tether anchor, each combination of masts and anchor means constituting a tether fixture,
 c. a flexible tether line having one end thereof secured to each said tether fixture and the other end thereof secured to a windborne vehicle having known lift/drag flying characteristics,
 d. said anchor means including a reel drum and said one end of at least a portion of the tether lines is secured to the reel drum,
 e. means to measure the length of tether line deployed from said reel drum relative to a low set point position,
 f. reversible drive power means for the reel drum,
 g. said power means being controlled by means to coordinate the drive direction and rate of said power means to maintain a predetermined tether tension when a length of line is deployed from said reel drum between a high set point and said low set point,
 h. means to measure a resultant tether restraint force exerted on said respective fixture by each respective vehicle in tethered, windborne flight,
 i. means to measure the azimuth angle vehicle flight in a wind,
 j. means to coordinate the tether restraint force of each vehicle with respective flight characteristics to determine the velocity of wind acting on said vehicle, and
 k. means to coordinate the wind azimuth angle and velocity acting on one of said vehicles with azimuth angle and velocity of at least one other said vehicle to determine the safety of wind condition for aircraft operation.

42. Apparatus as defined in claim 41 wherein
 torque limiting means is provided in a transmission link between said drive power means and said reel drum.

* * * * *